Aug. 27, 1946.                L. F. BEACH ET AL                    2,406,341
                            DIRECTIONAL GYROSCOPE
                           Filed Feb. 20, 1942              3 Sheets-Sheet 1

INVENTORS,
L. F. BEACH, O. E. ESVAL,
& A. W. LANE,
BY
THEIR ATTORNEY

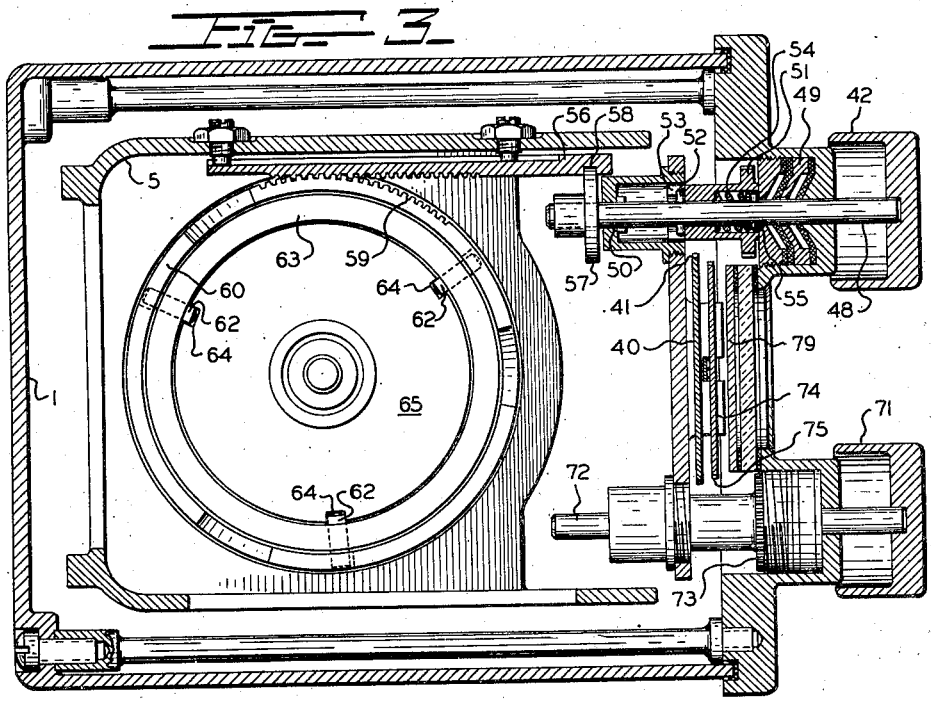

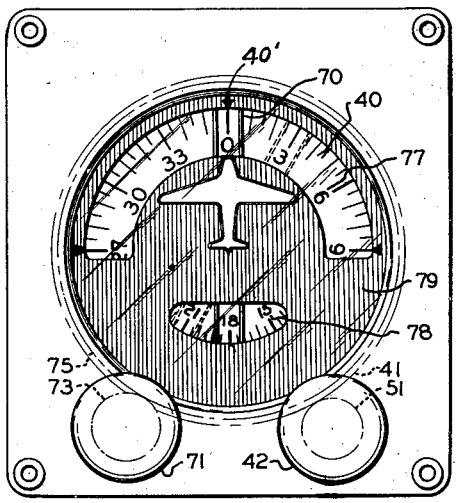
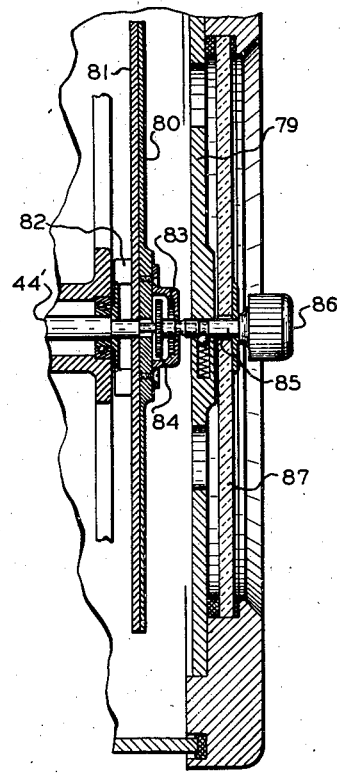
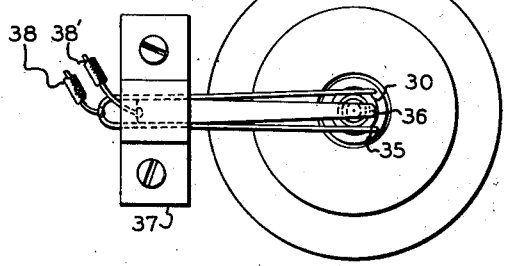
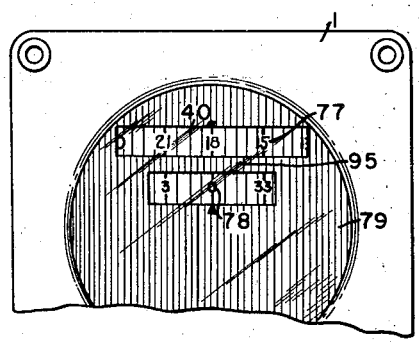
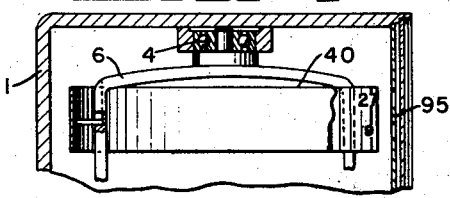

Patented Aug. 27, 1946

2,406,341

UNITED STATES PATENT OFFICE 2,406,341

DIRECTIONAL GYROSCOPE

Lennox F. Beach and Orland E. Esval, Merrick, and Arthur W. Lane, Freeport, N. Y., assignors to Sperry Gyroscope Company, Inc., Brooklyn, N. Y., a corporation of New York Application February 20, 1942, Serial No. 431,704

7 Claims. (Cl. 33—204)

This invention relates to improvements in gyroscopes of the type employed on aircraft to assist in maintaining course and attitude. More particularly, this invention concerns an improvement in electrically spun rotors of such gyroscopes and, in addition, improvements in the indicating and setting means for directional gyroscopes, which may or may not be of the slave or gyro-magnetic type.

Other novel features and details of the invention will be apparent from the following description when read in connection with the accompanying drawings, wherein Fig. 1 is a vertical section through a directional gyroscope designed in accordance with our invention.

Fig. 3 is a horizontal section taken on line 3—3 of Fig. 1.

Fig. 4 is a face view of the instrument on a reduced scale.

Fig. 5 is a vertical section showing a modified form of setting means for the course indicating dial.

Fig. 6 is a detail side elevation of the electrical contacts and end of one of the trunnion supports of the gyro instrument.

Fig. 7 is a vertical section of a directional gyro in which only sufficient of the same is shown to illustrate a modified form of the card construction shown in Fig. 4, and Fig. 8 is a fragmentary, front elevation of the instrument shown in Fig. 7.

Figure 1:
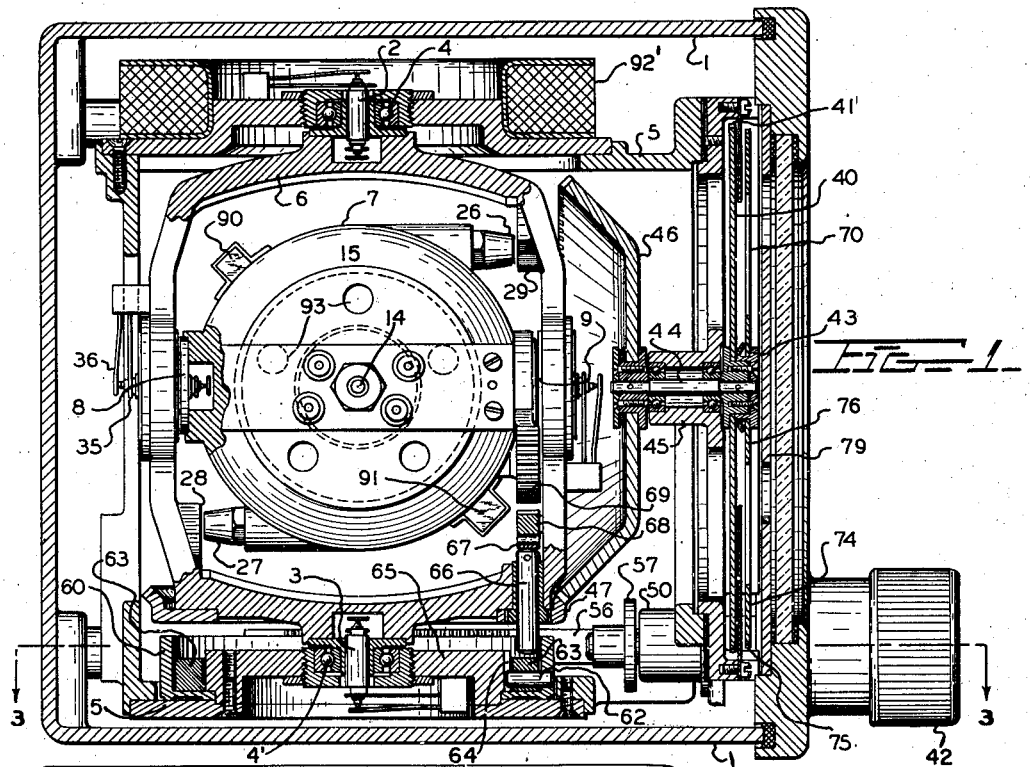

The instrument to which this invention is shown applied, as illustrated in the drawings, is an electrically spun directional gyroscope of the type which may or may not be slaved or controlled from a remote magnetic compass. The gyroscopic instrument is shown enclosed within an outer casing 1, the instrument being mounted for rotation about a vertical axis on trunnions 2, 3, journaled in anti-friction bearings 4, 4', respectively, located in an inner frame 5 mounted within the outer casing 1. A conventional vertical ring 6 is shown as including the axis defining trunnions 2, 3, said ring furthermore supporting the rotor bearing frame or case 15 of the gyroscope with freedom about a horizontal axis by means of trunnions 8, 9, which extend from opposite sides of the case and are journaled in suitable bearings mounted in the ring. The gyro rotor is of course suitably journaled to spin within the rotor bearing case 15, the spin axis of the rotor, indicated at 14, being normally disposed at right angles to both the vertical axis provided by the trunnions 2, 3, and the horizontal axis provided by the trunnions 8, 9.

The gyroscope is shown as pneumatically leveled by means of air jets which issue from the tangentially directed nozzles 26 and 27 mounted on the rotor bearing case, Fig. 1. The jets are directed against vertical knife edge baffles 28 and 29 on the vertical ring 6, said knife edges normally bisecting the jets from the nozzles when the rotor case is normally positioned. In the event of inclination of the case from a normal position, a torque is exerted by one of the jets around the vertical axis of the ring, which restores the case to its normal position.

The rotor 10 also serves as an air pump to supply air under pressure to the nozzles 26 and 27. Suitable blades or fins are situated on a portion of the peripheral surface of the rotor 10 for this purpose, air being obtained for the pump through suitable ports 93 situated in the end of the case 15.

Electrical energy is provided to drive the rotor 10, polyphase current being introduced to the motor of the gyroscopic instrument for this purpose by means of the spring wires or brushes shown in Figs. 1 and 6. For example, each of the trunnions providing the pivotal support for the gyro rotor case 15 may be made hollow. The hollow portion of the respective trunnions is in the form of a central cylindrical bore 30 (see Fig. 6) in which concentrically arranged sleeves of insulating material are placed. Between the sleeves is a current conducting sleeve and through the hole in the inner sleeve extends a conducting pin. Contacting with an extending portion of the conducting sleeve is a small hairpin spring 35 which carries one current lead. The conducting sleeve being longer than the longitudinal dimension of the trunnion consequently provides an area at opposite sides of the trunnion at which an electrical contact of this character may be made. A second current lead is carried by a light spring finger 36 clamped at one end in the same block 37 as is the spring wire 35 and having its free end resiliently engaging the central conducting pin. The block 37 shown in Fig. 6 is suitably mounted on the vertical ring 6. The contact making pin is longer than the current conducting sleeve. A similar three-fingered contact construction is employed at the inwardly disposed portion of the trunnion, the parts of which are respectively connected to leads 38, 38' by which current is supplied to the stator of the gyro rotor driving motor. This trunnion construction may be employed on both the vertical ring and gyro bearing case, thus supplying a total of four current leads in the present instance. Because of the point contact between the two ends of the contact-making pin and the spring fingers 36, and because of the very light engagement of the U-shaped springs 35 with the current conducting sleeve and the small diameter of this sleeve, friction about the trunnion axis is kept at a minimum. By increasing the number of interfitting sleeves in this construction, a plurality of conducting sleeves may be employed.

With reference to Figs. 1 and 4, we prefer to employ in connection with this directional gyroscope a disc-shaped vertical compass card indicator 40. As is well known in the art, the indicating portions of a compass comprise cooperating indicating members; namely, a card with graduations or calibrations thereon and a cooperating index or pointer, one of which members is rotatable and the other stationary, it being broadly immaterial which of the two is rotated from the compass. In this application, for illustrative purposes, we have shown the card 40 as the rotatable member, and the pointer 40' (Fig. 4) as the stationary member. Said card is shown in the form of a flat disc having teeth 41 on its periphery so that it may be reset from a setting knob 42, as hereinafter described. Disc 40 is clamped on a hub 43 which in turn is secured to a shaft 44 journaled in the forward part of the interior of the casing 1 in a fixed hollow bushing 45. A crown gear 46 is mounted, through a slip friction connection, on the inner or opposite end of shaft 44. The crown gear is rotated by a complementary crown or bevel gear 47 secured to the base of the vertical ring 6, so that as relative angular azimuthal displacement of the outer casing 1 and gyroscope occurs, the card will rotate through the same angle.

Figure 2:
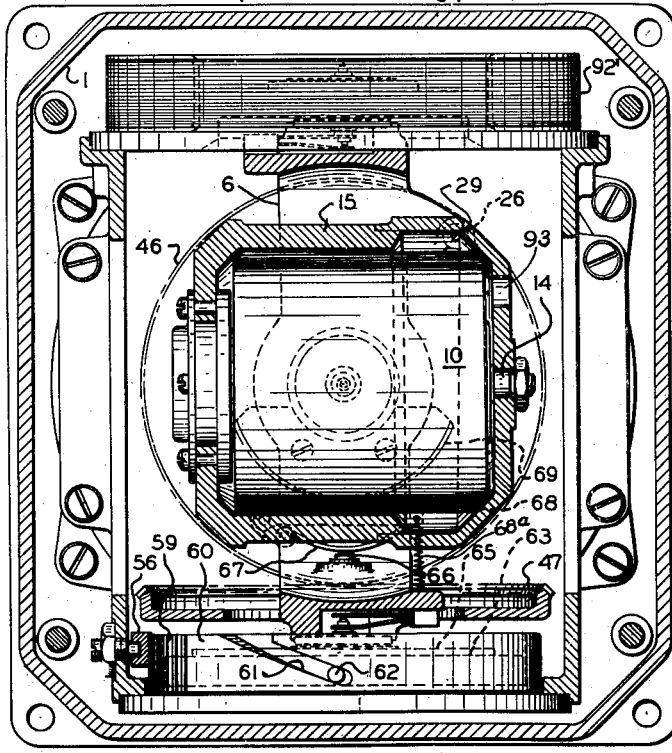
Fig. 2 is a vertical section taken at right angles to Fig. 1.

In order to reset the compass card or indicating disc 40, it is preferred to lock the rotor bearing case 15 of the gyroscope about its axis defined by trunnions 8 and 9 at the time the card is reset. For this purpose, the setting knob 42, Fig. 3, is constructed so that it may be pushed inwardly with respect to casing 1 and also be rotated to reset the card. The knob 42 is shown as secured to a shaft 48 which is slideably and rotatably journaled in bearing 49, 50, in suitable mounting structure within the outer casing 1. A pinion 51 is mounted to rotate with the shaft 48 by means of an engaging cross pin 52 and slot 53 construction. A limited axial movement of the pinion 51 along the shaft 48 is permitted by this construction, but the pinion is yieldingly held against such movement by means of a coil spring 54 contained within an opening at one end of the same. One end of the coil spring 54 bears against the internal wall in the opening within the pinion, and the other end bears against a cross pin 55 which extends through the shaft 48. As the knob 42 is moved inwardly, the teeth on the pinion 51 are brought into engagement with the teeth 41 on the disc 40, but in the event that the teeth do not properly engage at first, the spring 54 permits the pinion 51 to yield until the teeth properly engage. With the parts thusly engaged, the card 40 may be readily reset in a desired position by the operator by turning the knob in the proper direction. Inwardly directed movement of the knob 42 also displaces a slideable rack bar 56 by means of the engagement of a collar 57 on the inner end of the shaft 48 and a groove 58 on the side of the rack bar. The teeth on the rack bar 56 mesh with a gear sector 59, Figs. 2 and 3, on a ring 60 which is rotatably mounted below the vertical ring supporting structure for the gyroscopic instrument. The ring 60 is shown as having a number of circumferentially spaced inclined slots 61 therein into each of which projects a radially extending pin 62 situated on a smaller ring 63 concentrically mounted within said ring 60. Rotating movement of the ring 63 is prevented by an extending portion of the respective fixed pins 62 therein in a like number of spaced vertical slots 64 contained in the periphery of a fixed base 65. It will be seen, therefore, that rotation of the outer ring 60 by rack 56 will lift the inner ring 63. As said ring 63 is lifted, Fig. 1, it engages the lower end of a vertically positioned pin 66 which is slideably mounted in the vertical ring 6. The upper end of pin 66 is indicated as engaging a curved leaf spring 67 secured to a horizontal rack 68 pivoted at one end on the vertical ring. Normally, rack 68 is disengaged by a spring 68a from a gear sector 69 suitably secured to the exterior of the bearing case 15, but when the pin 66 is lifted, the teeth of the rack 68 engage the gear sector 69 to thereby lock the gyroscope about the horizontal axis of the same defined by trunnions 8 and 9. The spring 67 serves to prevent damage to the teeth of the engaging rack and sector in the event that the same do not mesh properly when initial contact between the parts is made. The contact of pin 66 and ring 63 locks the vertical ring 6 of the gyroscopic instrument.

It will be noted that according to the present invention, the gyroscopic instrument is locked and is not manually reset about its vertical axis. Also, the card 40 of the instrument may be manually reset without effecting movement of the rotor bearing case because of the slip friction mounting of the gear 46.

In addition to the compass azimuth indicating card 40, there is also employed in a suitably mounted position at the dial of the instrument a course indicator which may be in the form of index markings or thin spokes 70, Fig. 4, which are shown as constructed in a large disc 74, Figs. 1 and 3, having teeth 75 on its periphery. The disc 74 is cut out around its hub forming portion 76 to form the aforesaid spokes or markings which connect the hub and toothed peripheral rim. By an alternative construction, the disc 74 may be made of transparent material on which the markins are painted. This disc also has a slip friction connection with the aforementioned hub 43 so that it is normally turned with the card through the meshing gears 46 and 47. However, it may be independently adjusted, when changing course, by means of a separate knob 71 mounted on a shaft 72. By moving the knob 71 in an inward direction with relation to casing 1, the pinion 73, Fig. 3, is brought into operative engagement with teeth 75 on the periphery of the disc 74. The course indicator markings 70 may then be set in any desired position with reference to the compass card 40 by manually rotating the knob 71 in the proper direction. Because of the slip friction connection, such action does not result in an appreciable precessing movement of the rotor bearing case of the instrument. The internal construction of the pinion 73 and the mounting structure for the same may be similar to that described in detail in connection with the compass card resetting mechanism.

Preferably, the azimuth direction indicating card 40 is provided with two independent sets of concentric scales 77 and 78, one of which, 77, is of larger radius than the other. A mask 79 is provided to cover the major portion of said dials, but is cut out at the top on a comparatively large radius to show only the scale 77. Near the bottom, the mask has a smaller cut-out portion on a smaller radius to show only the scale 78. By this construction, the making of precedure 180° turns is facilitated since the aviator can see at a glance just what the course reading should be when such turn is completed, by looking at the bottom dial. At the same time any confusion as to the heading of the craft is avoided because of the prominence of the heading indication at the top of the dial. It will be noted that the figures on the smaller dial 78 appear right-side-up as well as those on the larger dial 77, which would not be the case if only one grouping of figures were employed. The respective scales 77 and 78 are read against suitable lubber lines provided in the mask or in the window at the front of the instrument. The spaced openings in the mask 79 are so situated with relation to the rotatable card 40 and the respective scales thereon that a desired 180° spacing interval between the scales is obtained. Additional lubber line indications may be employed to show a new course 90° removed from the original heading.

In the modification of this form of the invention shown in Figs. 7 and 8, the compass card 40 is ring-shaped and is directly mounted on the vertical ring of the gyro supporting structure. The exterior surface of the card is graduated to include the independent groups of direction indicating concentric scales 77 and 78 thereon which in this instance are noted in 180° spaced relation. As shown in Fig. 8, the openings in mask 79 are rectangular, instead of circular in shape, the same providing an intervening straight shield 95 therebetween which separates the respective groups of spaced direction designating markings thereon.

Fig. 5 illustrates a modified form of setting means for a dial. In this form of the invention, the dial proper is in the form of a flat disc 80 and is made of iron or other magnetic material. The dial is normally held snugly against a disc 81 of non-magnetic material by means of a permanent or electrical magnet 82 placed behind the disc 81. The magnet structure may form the hub of the disc 81, the magnet and disc being secured to the shaft 44' of the gear 46. Also secured to the disc 80 is an internal gear 83 which is normally spaced from a pinion 84 on the shaft 85 of a knob 86 that is slideably journaled in a hole through the mask 79 and the glass face 87 of the instrument. By pulling out on the knob 86, not only will the pinion 84 be engaged with the internal gear 83, but also the disc dial 80 will be disengaged from the disc 81 whereupon the knob may be rotated to reset the dial 80. By then pushing the knob in, the two discs will be again brought into frictional engagement with the aid of the magnet 82 and thus the dial will be recoupled to the gyroscope. In this form of the invention, the slip friction connection of the gear 46 with its hub may be omitted. This construction, of course, may be used either in connection with a compass card or a device associated with a compass card for providing course indication.

If it is desired to employ the gyroscope as a slave to a magnetic compass or to otherwise remotely control the same, this may be readily accomplished by means of a permanent magnet or group of magnets as indicated at 90, 91, Fig. 1, fixed to the rotor bearing case 15 and a magnetic field producing coil 92' controlled from the magnetic compass. Upon excitation of the coil in one direction or the other, a properly directed torque is exerted on the horizontal axis 8, 9 of the case 15, as will be readily apparent, to cause orientation of the instrument in azimuth.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In a locking and resetting mechanism for directional gyroscopes, the combination with a directional gyroscope comprising a gyroscopic rotor, a bearing frame therefor, a vertical ring having a vertical axis about which it may rotate and in which said frame is mounted to pivot on a horizontal axis, of a rotatably mounted direction indicating member, means for operatively connecting said card to be rotated by said vertical ring, a slip friction connection in said connecting means between the member and ring whereby the member may be reset, normally ineffective means for locking the directional gyroscope to prevent rotation of the ring about the vertical axis, and means for simultaneously operating said locking means and effecting a resetting movement of said member whereby to obtain movement of said member independently of said vertical ring through the slip friction connection.

2. In a locking and resetting mechanism for directional gyroscopes, the combination with a directional gyroscope comprising a gyroscopic rotor and a bearing frame therefor, a vertical ring having a vertical axis about which it may rotate and in which the bearing frame is mounted to pivot on a horizontal axis, a compass indicating member connected to said vertical ring, a slip friction member in the connection between said ring and indicating member whereby the indicating member may be reset, normally ineffective means for locking said bearing frame about both its vertical and horizontal axes, and means for simultaneously operating said locking means and effecting a resetting movement of said compass indicating member whereby to obtain movement of said indicating member independently of said vertical ring through the slip friction connection.

3. In a locking and resetting mechanism for directional gyroscopes, the combination with a gyro instrument of a direction indicating member, a slip friction connection between the said gyro and member whereby the member may be reset, normally ineffective means for locking the gyro instrument against azimuthal movement, and means including a common manually operable actuating means for operating said locking means and for effecting a resetting movement of said member through slippage of said connection whereby the member is reset without affecting the gyroscope.

4. The combination of a gyro instrument, a direction indication card, means including a slip friction connection for effecting movement of said card by said instrument but permitting independent movements thereof for card-resetting purposes, a course indicating dial coaxially and cooperatively arranged with respect to said card to provide a course indication, a second slip friction connection for connecting said dial to move with the card, normally ineffective means for locking said gyro instrument, common means for operating said locking means and for effecting a resetting movement of said card independently of the gyro instrument through the slip friction connection therefor, and means for resetting the position of said dial with respect to said card through the slip friction connection therefor without altering the position of said card or its gyro controlling instrument.

5. The combination with a directional gyroscope of a direction indicating card, means for operatively connecting said card for rotation by said gyroscope, a slip friction connection in said connecting means between the card and gyroscope whereby the card may be reset, normally ineffective means for locking the gyroscope to prevent azimuthal rotation thereof, means for simultaneously operating said locking means and effecting a resetting movement of said card, a course-indicating dial coaxially and cooperatively arranged with respect to said card, means for normally turning said dial with said card, and means for resetting said dial with respect to said card.

6. In a locking and resetting mechanism for directional gyroscopes, the combination with a directional gyroscope including a rotor, a rotor-bearing frame therefor, a vertical ring pivotally supporting said rotor-bearing frame and having an axis about which it may rotate, of a rotatably mounted direction-indicating member, means for operatively connecting said member for rotation thereof by said vertical ring, normally ineffective means for locking the gyroscope to prevent rotation of the ring about its axis, and means for simultaneously holding said locking means in gyro-locking position and effecting movement of said member relative to said ring.

7. In a locking and resetting mechanism for directional gyroscopes, the combination with a gyro instrument including a vertical ring adapted to rotate in azimuth about the azimuth axis of said gyro, of a direction-indicating member, means for operatively connecting said member for rotation thereof by said vertical ring, normally ineffective means for locking the gyro to prevent rotation of the ring in azimuth, and a common, manually operable means for operating said locking means and for effecting movement of said member relative to said vertical ring whereby said member may be reset without affecting the gyro.

LENNOX F. BEACH.
ORLAND E. ESVAL.
ARTHUR W. LANE.